United States Patent [19]

Goss et al.

[11] Patent Number: 5,359,961
[45] Date of Patent: Nov. 1, 1994

[54] ANIMAL LITTER WITH GALACTOMANNAN GUM CLUMPING AGENT AND CARRAGEENAN GUM EXTENDER

[75] Inventors: G. Robert Goss, Quincy; Olga I. Spaldon, Crystal Lake; Nancy L. Nolan, Mundelein, all of Ill.

[73] Assignee: Oil-Dri Corporation of America, Chicago, Ill.

[21] Appl. No.: 14,216

[22] Filed: Feb. 5, 1993

[51] Int. Cl.⁵ .............................. A01K 29/00
[52] U.S. Cl. ........................................... 119/173
[58] Field of Search ............ 119/171, 172, 173; 604/904

[56] References Cited

U.S. PATENT DOCUMENTS

| | | | |
|---|---|---|---|
| 4,058,124 | 11/1977 | Yen et al. | 604/904 |
| 4,671,208 | 6/1987 | Smith | 119/173 |
| 4,844,010 | 7/1989 | Duchacme | 119/173 |
| 5,016,568 | 5/1991 | Stanislowski et al. | 119/173 |
| 5,094,189 | 3/1992 | Aylen et al. | 119/173 |
| 5,101,771 | 4/1992 | Goss | 119/173 |
| 5,152,250 | 10/1992 | Loeb | 119/171 |
| 5,176,107 | 1/1993 | Buschur | 119/171 |
| 5,183,010 | 2/1993 | Raymond et al. | 119/173 |
| 5,188,064 | 2/1993 | House | 119/172 |
| 5,193,489 | 3/1993 | Hardin | 119/173 |

*Primary Examiner*—Gene Mancene
*Assistant Examiner*—Todd E. Manahan
*Attorney, Agent, or Firm*—Olson & Hierl, Ltd.

[57] ABSTRACT

A composition for a clumping animal litter forms agglomerates upon contact with relatively small amounts of an aqueous liquid, such as an animal body fluid, yet rapidly disperses upon disposal in a household plumbing system to produce only non-swelling clay particles and biodegradable end products. The animal litter composition is substantially dust-free, and can be safely ingested by pets. The composition includes non-swelling clay and/or diatomaceous earth particles and a galactomannan gum that has been distributed in a non-toxic liquid vehicle on the surface of the free-flowing clay particles. The galactomannan gum may be a guar gum or a locust bean gum, or an ether derivative of guar gum or locust bean gum. The animal litter composition may also include borax, xanthan gum, a carrageenan gum, or an alginate.

3 Claims, 1 Drawing Sheet

ANIMAL LITTER WITH GALACTOMANNAN GUM CLUMPING AGENT AND CARRAGEENAN GUM EXTENDER

TECHNICAL FIELD

This invention relates to animal litter compositions and to methods for manufacturing such compositions.

BACKGROUND OF THE INVENTION

Clay and other absorbent particles have long been used for providing small animals with dry, sanitary, dustless and relatively odorless litter and bedding. For example, U.S. Pat. No. 2,649,759 to Gibbs describes the use of porous calcined clay as a litter for poultry and small animals.

Similarly, swelling clays have long been recognized as one means of facilitating separation and removal of urine-soaked clay particles from an otherwise fresh bed of animal litter. Such clays expand in volume and become tacky when wetted, forming clumps of spent clay which can be individually removed from the bed. U.S. Pat. No. 5,000,115 to Hughes describes a method and a composition of absorbing animal dross using a swellable clay.

The swelling clay, upon contact with water, typically expands to ten or more times its original dry volume. If not completely loaded with animal urine at the time of disposal, the swelling clay will continue to expand when contacted with additional liquids as, for example, within a household plumbing system. During a period of continued swelling, the swelling clay has a propensity for becoming lodged within any recess, nook, or cranny, where it may otherwise have only temporarily come to rest.

This shortcoming of the swelling clay is compounded by a tacky surface texture which often accompanies the swelling of the clay. Further, because the swelling clay is an inorganic material that is not subject to biodegradation, a deposit of the swelling clay once lodged will tend to persist and accumulate more deposits. Over a period of time, the household plumbing system in which they are lodged may become blocked.

At least partly to avoid the plumbing blockages associated with the swelling clays, clumping agents have been devised which, when added to a bed containing non-swelling clay particles, cause the particles to clump together into an agglomeration of sufficient size and strength to be removed by a sieving spoon. U.S. Pat. No. 4,638,763 to Greenberg describes a litter composition utilizing anhydrous sodium sulfate as a clumping agent. On contact with liquid water, the sodium sulfate presumably dissolves to form an aqueous solution which can be removed from household waste water, if at all, only by sophisticated tertiary water treating equipment. The United States Government currently sets limits on the concentration and amount of sulfates which municipalities may discharge from their treatment facilities. A need exists for a biodegradable clumping agent capable of acting upon particles of non-swelling clay.

U.S. Pat. No. 4,591,581 to Crampton et al. recommends polysaccharides, such as carboxymethyl cellulose, hydroxypropyl cellulose, and soluble gums which hydrate in water, as ingredients intimately admixed with clay fines as binders and for increasing the absorbency of a pressure-compacted clay mineral particle suitable for use as cat litter. However, since these polysaccharide additives, while biodegradable, are distributed throughout the pressure-compacted clay particles, it is unlikely that these additives are present in sufficient concentration on the surface of the mineral clay particles to produce clumping when contacted by excreted animal body fluids.

U.S. Pat. No. 5,014,650 to Sowle et al. describes animal litter which is a dry blend of a porous, inert solid substrate, such as particulate clay, and a dry, particulate cellulosic ether. U.S. Pat. No. 4,685,420 to Stuart describes a similar animal litter that utilizes dry blends of clay with a particulate water-absorbent synthetic polymer. When excreted animal body fluids contact such litter, gelled agglomerates, or clumps, are produced.

While the foregoing type of clumping animal litter avoids the aforementioned shortcomings of the animal litters derived from swelling clays such as sodium bentonite, the animal litter nevertheless is dusty during manufacture, as well as dispensing. In addition, in such animal litter, the dry particulate cellulosic ether or the water-absorbent polymer tend to segregate from the particulate clay during handling and shipping.

What is needed is a relatively dust-free clumping animal litter that can be periodically disposed through a household plumbing system without fouling the system or creating an environmental nuisance. The clumping agent should not be so sensitive as to be triggered by water vapor which is always present in the atmosphere, and should not separate from the particulate clay during handling, yet should respond relatively quickly upon contact with an aliquot of excreted body fluids. A desirable clumping agent forms clumps strong enough for separation and disposal within a few minutes after formation. Ideally, the clumps hold together and remain durable for a period of at least a day or two, rather than weaken or disintegrate over time.

Moreover, animals may ingest some of the animal litter while grooming. Therefore, it is important that all of the components of the animal litter be safe for animal consumption. This is especially true for animal litter which will be used by household pets and may occasionally be spilled or tracked about a floor of a home. The present clumping animal litter satisfies the foregoing desires.

SUMMARY OF THE INVENTION

The present invention provides a clumping animal litter composition which relatively quickly forms agglomerates upon contact with relatively small aliquots of an aqueous liquid, such as water or an excreted body fluid, yet rapidly disperses upon disposal into only non-swelling particles and biodegradable end products. The present, improved animal litter is substantially dust-free, can be safely ingested by pets, and passes freely through household plumbing.

The clumping animal litter contemplated by the present invention comprises discrete free-flowing and non-swelling absorbent particles such as clay, diatomaceous earth, and mixtures thereof, and a galactomannan gum as a clumping agent carried on the surface of the free-flowing absorbent particles. The galactomannan gum may be a guar gum or a locust bean gum, or an ether derivative of either guar gum or locust bean gum. The animal litter composition may also include borax as a complexing agent and/or an extender such as a xanthan gum, a carrageenan gum, an alginate, pregelatinized starch, or the like.

The clumping agent is distributed on the discrete absorbent particles that constitute the animal litter by means of a liquid vehicle which can be water or an aqueous solution, an oleaginous vehicle, an alkylene glycol, as well as mixtures thereof. Depending upon the volatility of the liquid vehicle, it may or may not remain on the discrete absorbent particles after distribution of the galactomannan gum on the surfaces thereof. Embodiments of this invention in which discrete non-swelling absorbent particles have on their surface a galactomannan gum as well as an oleaginous vehicle, such as a mineral oil, may also include a non-ionic emulsifier, preferably one having an HLB value of at least about 10.

In a preferred embodiment, the animal litter composition is made up of discrete, non-swelling clay particles having a particle size in the range of about 4 mesh to about 60 mesh, U.S. Sieve Series. A mineral oil is present on the clay particles in an amount of about 2 to about 20 weight percent. A non-ionic emulsifier with an HLB value of at least about 10 is present on the clay particles in an amount of about 0.2 to about 1.6 weight percent. Guar gum is preferably dispersed in the mineral oil as a clumping agent. Preferably, the clumping agent is present on the clay particles in an amount of about 0.25 to about 5 weight percent. The foregoing amounts of the mineral oil, the non-ionic emulsifier, and the clumping agent are expressed in weight percent, based on the weight of the clay particles.

A method aspect of this invention involves providing a suspension of a galactomannan gum clumping agent in a liquid vehicle. The suspension is applied to a particulate, non-swelling absorbent material by distributing the suspension substantially uniformly over the particulate absorbent. Preferably, the suspension is distributed by spraying while the absorbent particles are agitated. The suspension may include a non-ionic emulsifier if the vehicle is oleaginous.

DESCRIPTION OF THE PREFERRED EMBODIMENTS

Figure 1:
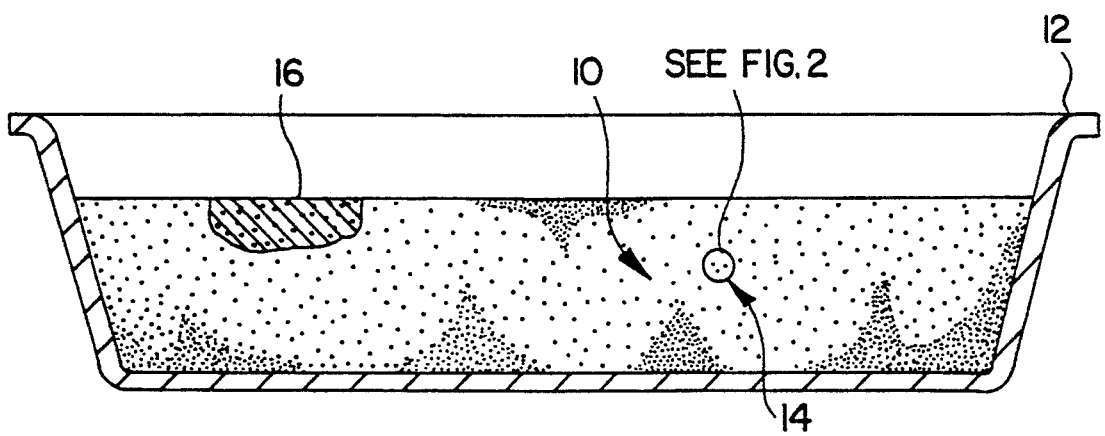
FIGS. 1 and 2 are sectional elevations showing a litter bed of clumping animal litter that embodies this invention and is contained in a litter box.

A clumping animal litter of this invention is in the form of free-flowing particulates of clay and/or diatomaceous earth that are substantially non-swelling and are intimately associated with an organic clumping agent that is biodegradable. This clumping agent is a galactomannan gum that is distributed over the surface of the free-flowing clay particles in a non-toxic vehicle.

The present invention is eminently well suited for the containment of aqueous body fluids excreted or spilled by small animals. Such liquids include any aqueous liquid which may be excreted or regurgitated by the animal, as well as spilled foodstuffs or blood.

The present invention is useful as litter for household cats, but the scope of the invention itself is not so limited.

The non-swelling clay suitable for the present purposes is an earthy material composed primarily of hydrous aluminum silicates and is to be distinguished from the so-called swelling clays that are capable of absorbing several times their weight of an aqueous liquid upon swelling. Relatively small amounts of non-clay materials can also be present. The non-swelling clay is usually derived from a naturally occurring raw material, but synthetic non-swelling clays are also suitable. A clay which is particularly useful in practicing the present invention is a non-swelling smectite, i.e., a clay composed of units constituted by two silica tetrahedral sheets with a central alumina octahedral sheet. See, for example, Grim, *Clay Mineralogy*, 2nd ed., McGraw-Hill, Inc., New York, N.Y. (1968), pp. 77–78. Smectite-attapulgite mixtures can also be used for this purpose.

It is common for individual clay particles to change in volume to some extent when absorbing an aqueous liquid. Typically, the "non-swelling" clays only expand so that a fully hydrated clay particle occupies less than about 150% of the volume that the particle occupied in an anhydrous state. In contrast, the swelling clays are capable of expanding more than 500% during hydration. An example of a well known swelling clay is sodium bentonite, also called Wyoming bentonite. That particular swelling clay is commonly utilized as an oil-well drilling mud because of its propensity to swell and absorb large volumes of water. In a hydrated state, swelling clays often exhibit a tackiness which will cause adjacent particles of the swelling clay to agglomerate.

The non-swelling clay utilized in the litter compositions of the present invention expands minimally while travelling along a plumbing system for disposal, thus flushability of the clumping animal litter is maintained and plugging of the plumbing system is not likely. Further, non-swelling clays do not ordinarily exhibit the tackiness associated with hydrated swelling clays, and so are less likely to agglomerate into large masses capable of adversely affecting the functioning of the plumbing system.

Smectites are particularly well suited as the particulate non-swelling clay constituent for the present purposes. These clays can range in color from a cream or grey off-white to a dark reddish tan color. Such smectites are frequently referred to in the trade under designations such as Mississippi Grey and Mississippi Tan. These particular clays are montmorillonites and contain calcium and/or magnesium in the form of exchangeable cations.

The clay or diatomaceous earth constituent of the present compositions is in the form of discrete particles of variable particle size. These particles preferably are rounded in shape to facilitate bagging and handling, and have surfaces that are reasonably smooth to the touch so that an animal feels comfortable standing upon them. Although particle sizes up to about 1 inch in diameter are suitable, a preferred size of absorbent particles is in the range of about 4 by about 60 mesh, U.S. Sieve Series. For a tabulation of U.S. Sieve Series screen nomenclature, see *Perry's Chemical Engineering Handbook*, 6th Ed., McGraw-Hill, Inc., New York, N.Y. (1984), p. 21-15 (Table 21-6). An especially preferred size range for the absorbent particles is the range of about 20 mesh to about 60 mesh, U.S. Sieve Series.

Within the preferred particle size ranges, the absorbent particle size can be manipulated as a means of modulating the contours of the clump that is produced upon contact with an aqueous liquid. Relatively flatter, thinner clumps are more easily located by probing the animal litter with, for example, a sieving spoon than, are spheroidal clumps of similar volume. On the other hand, thinner clumps are more subject to breakage. The particle size distribution of the absorbent particles may therefore be tailored to a preference held by a particular group of consumers. For relatively thinner, flatter clumps, a particle size of about 20 mesh by 60 (20/60) mesh, U.S. Sieve Series, is preferred. On the other hand, for relatively heavier, spheroidal clumps, a relatively coarser particle size in the range of about 4 by 20 (4/20) mesh, U.S. Sieve Series, is preferred.

The clumping agent carried on the surface of the individual absorbent particles is a water-soluble galactomannan gum, such as a guar gum or a locust bean gum, or an ether derivative thereof, that forms a gel upon contact with the excreted aliquot of a body fluid. A non-toxic liquid vehicle is used to distribute the galactomannan gum on the absorbent particles. The liquid vehicle may be a fugitive liquid, e.g., water or a water-ethanol admixture, that evaporates afterwards, or it can be a relatively non-volatile liquid, e.g., mineral oil, soybean oil, or propylene glycol, that not only serves as a vehicle for the distribution of the clumping agent without substantial dusting, but also aids in minimizing the likelihood of premature clumping under humid conditions. However, upon contact with an appropriate amount of an aqueous liquid, adjacent absorbent particles bind to one another to form a clump within a matter of minutes. The formed clump is sufficiently durable for mechanical separation and removal from a bed of otherwise substantially dry animal litter. Also, the formed clump preferably remains intact and durable for at least about a day in order to provide the animal's owner with an opportunity to remove and dispose of the clump.

A galactomannan gum is a carbohydrate polymer containing galactose and mannose units, or an ether derivative of such a polymer. The galactomannan gum is characterized by a linear structure of $\beta$-D-mannopyranosyl units linked (1→4). Single-membered $\alpha$-D-galactopyranosyl units, linked (1→6) with the main chain, are present as side branches. Galactomannan gums include a guar gum which is the pulverized endosperm of the seed of either of two leguminous plants (*Cyamopsis tetragonalobus* and *psoraloides*). Also included is a locust bean gum found in the endosperm of the seeds of carob tree (*Ceratonia siliqua*). A preferred form of galactomannan gum is guar gum commercially available from Rhone-Poulenc under the trade name Unigar 250.

Galactomannan gums which are in the form of ether derivatives and are useful in the present invention can be obtained from the guar gum or the locust bean gum by substituting carboxyalkyl, hydroxyalkyl, or quaternary amine groups for hydroxyl functionalities in a manner known in the art. Introduction of carboxyalkyl and quaternary amine groups modifies the way in which the galactomannan gum reacts with hydrated mineral surfaces. The rate and degree of adsorption between the ether derivative and the surface can be increased or decreased. Hydroxyalkylation of the galactomannan gum decreases the affinity of the resulting ether derivative for hydrated mineral surfaces and increases the solubility of the ether derivative in water and water-miscible solvents. A preferred form of galactomannan gum is the ether derivative known as hydroxypropyl guar gum. Another preferred form of galactomannan gum is the ether derivative which is commercially available from Rhone-Poulenc under the trade designation Progacyl CP-7.

Additional components that make the clumping agent pH-dependent can also be present. For example, the guar gum as well as the locust bean gum gels in the presence of dissociated borate ions in an alkaline aqueous solution. However, the resulting gel liquifies when the pH of the solution is lowered below about 7. A similar pH-dependent, reversible gelation is observed with ether derivatives of guar gum in which a preponderance of the mannose units and galactose units retain their secondary cis-hydroxyl groups.

In a pH-dependent embodiment, the present composition includes borax or boric acid, as well as the galactomannan gum. Borax or boric acid can be present in an amount up to about 1% by weight, based on the weight of the clay particles. Both constituents are dispersed on the surface of the clay particles, if present. It is preferred that borax is present as solid particles in a substantially unhydrated form, thus an oleaginous vehicle is the preferred vehicle in such instances for distributing the galactomannan gum into the clay particles. Upon contact with animal urine, borax dissolves and forms a gel with the galactomannan gum which clumps with the clay particles to form agglomerates. An alkaline buffer system can also be included in the pH-dependent embodiment to further enhance the action of borax or other boric acid derivatives that promote gelling.

Subsequently, when the pH-dependent clumping agent bearing agglomerates are disposed of in a water-filled household plumbing system, the borax gel is in a substantially neutral environment. The gel then liquifies and releases the substantially non-swelling absorbent particles. As an additional benefit, borax, when present, inhibits the growth of bacteria on the animal litter and thus minimizes odor development.

Alternatively, the liquid vehicle used to distribute the galactomannan gum may contain xanthan gum as an extender for the galactomannan gum. Xanthan gum is an anionic polysaccharide produced through fermentation by the microorganism *Xanthomonas campestris*. The xanthan gum molecule contains a $\beta$-(1→4)-linked D-glucopyranosyl backbone chain. To the backbone chain are appended trisaccharide side chains composed of D-mannopyranosyl and D-glucopyranosyluronic acid residues.

Xanthan gum in water or animal body fluid produces a solution with high viscosity at a relatively low concentration of gum. The xanthan gum solution exhibits pseudo-plasticity, i.e., the viscosity decreases as shear rate increases. The presence of the xanthan gum increases the usefulness of the present invention in that the viscosity of an aqueous solution is increased synergistically when both xanthan gum and guar gum are components. The more viscous solution produces stronger clumps.

The galactomannan gum is introduced into the liquid vehicle, at least initially, in the form of dry, unhydrated particles. To obtain the maximum benefit from the galactomannan gum during the clumping stage, it is necessary to wet each of the particles and bring them to a fully hydrated state as part of a smooth, uniform solution.

The presence of the liquid vehicle serves to separate the guar gum particles during the manufacturing process, especially when the liquid vehicle is oleaginous. Additional dispersion and separation of the guar gum particles during manufacture can be accomplished by suspending other powders in the liquid vehicle along with the guar gum particles. One particular embodiment of the animal litter composition contemplates the presence of suspended calcium carbonate, e.g., limestone, particles in the liquid vehicle for this purpose.

A pregelatinized food starch is also suitable as an extender. One example of a suitable modified starch extender is a mixture of pregelatinized, cold-water soluble potato starch (a distarch phosphate) and corn syrup solids which is commercially available from the A. E. Staley Manufacturing Company of Decatur, Ill. under the trade name Redisol 78D. For example, guar gum and this distarch phosphate may be present in the liquid in equal amounts by weight, preferably at a combined weight of about 1% by weight, based on the dry weight of the clay particles present.

Another class of thickeners that can be used as a galactomannan gum extender in the compositions of the present invention are the alginates. Alginates are the salts of alginic acid, which is derived from a polysaccharide found in brown seaweeds (e.g., *Macrocystis pyrifera*). The principal commercially available alginates are ammonium alginate, potassium alginate, sodium alginate, propylene glycol alginate, and calcium alginate. Of these, sodium alginate is preferred for its high apparent viscosity at low shear rates which is useful in forming clumps. A suitable sodium alginate is commercially available from AEP Colloids, Inc. under the trade name 1100S. A combination of sodium alginate and xanthan gum as extenders exhibits desirable apparent viscosity across a broad range of shear rates.

In yet another embodiment, carrageenan gum can be utilized as an extender for the guar gum dispersed in the liquid vehicle. Carrageenan gums are sulfated linear polysaccharides of D-galactose and 3,6-anhydro-D-galactose. They are obtained from certain species of red seaweeds. Carrageenans are characterized structurally by a linear polysaccharide chain built up of alternating 1,3-linked β-D-galactopyranosyl and 1,4-linked α-D-galactopyranosyl units.

Since the carrageenan gum dissolves in an animal body fluid at approximately room temperature to provide the clumping effect, only carrageenans or salts of carrageenans which are soluble in cold water are employed in the present invention. Particularly, lambda-carrageenan and the sodium salts of kappa- and iota-carrageenan are preferred. The Greek letter prefixes, by convention, refer to certain chemical structures which are assumed to repeat in ideal, absolutely pure and regular carrageenans. Commercially available kappa-, iota-, and lambda-carrageenans are mixtures which approach the ideal chemical structures. [See Davidson, *Handbook of Water-Soluble Gums and Resins*, McGraw-Hill, Inc., New York, N.Y. (1980), page 5-5].

The galactomannan gum containing biodegradable organic clumping agent is distributed over the surface of the individual absorbent particles in a liquid vehicle, preferably an oleaginous vehicle such as soybean oil or mineral oil, or in an aqueous solution of diethylene glycol, triethylene glycol, or propylene glycol. In this manner, the liquid vehicle functions as a binder for the clumping agent and concurrently provides dust abatement as well. While the liquid vehicle substantially coats and penetrates marginally into the surface of the individual clay particles, the penetration does not affect adversely the absorption and liquid retention capabilities of the clay particle core portion. The term "mineral oil," as used herein and in the appended claims, denotes a mixture of liquid hydrocarbons obtained from petroleum and having a specific gravity in the range of about 0.82 to about 0.95.

As stated hereinabove, the liquid vehicle can be either oleaginous, meaning oily in nature, or aqueous. Propylene glycol disperses galactomannan gum particles relatively well, but is currently rather expensive for use as a major component of the liquid vehicle. Water, by itself, is less desirable as a liquid vehicle because it does not readily dissolve galactomannan gums, especially at a relatively lower temperature. Mineral oils and blends of glycol with water are presently preferred. The liquid vehicle may additionally include a surfactant.

The liquid vehicle forms either a suspension or a physical solution with the galactomannan gum, but does not react chemically with it. The liquid vehicle is relatively nonvolatile, and preferably remains on the clay particles in liquid form, dispersing the galactomannan gum particles over the surface of the absorbent particles and promoting substantially uniform, smooth hydration while the galactomannan gum particles adhere to the absorbent particles.

A convenient method for preparing animal litter embodying the present invention is to create a suspension of galactomannan gum in an oleaginous liquid vehicle such as a mineral oil or in an aqueous glycol solution, and then distributing the resulting suspension over particulate non-swelling absorbent particles. Spraying the suspension onto agitated particulate absorbent material is the preferred method of distribution. Alternatively, the absorbent particles may be dipped into the suspension or rolled in a drum containing a relatively small amount of the suspension. The suspension is distributed substantially uniformly over the particulate absorbent material in the form of a coating or surface layer but need not completely cover the entire surface of any absorbent particle.

To facilitate the dispersion of the clumping agent throughout the mineral oil and, consequently, promote subsequent clumping of the absorbent particles, a moderately lipophilic, non-ionic emulsifier for the mineral oil is preferably added as well. Such moderately lipophilic, non-ionic emulsifier has a hydrophile-lipophile balance (HLB) value of at least about 10, as determined by methods described in The Atlas HLB System, 2d Ed. (Revised), Atlas Chemical Industries, Inc., Wilmington, Del. (1963).

Suitable illustrative non-ionic emulsifiers are the ethoxylated alkyl phenols, such as polyoxyethylene(6) nonyl phenyl ether (HLB 10.8), polyoxyethylene(5) nonyl phenyl ether (HLB 10.0), polyoxyethylene(9) nonyl phenyl ether (HLB 13.0), and the like. Also suitable are the mixtures of oleate esters of sorbitol and sorbitol anhydrides condensed with ethylene oxide, such as polyoxyethylene(5) sorbitan monooleate (HLB 10.0), polyoxyethylene(20) sorbitan trioleate (HLB 11.0), polyoxyethylene(20) sorbitan monostearate (HLB 14.9), and the like. Mixtures of the foregoing and like emulsifiers can also be utilized for the present purposes.

Based on the weight of the mineral oil present, the non-ionic emulsifier can be present in an amount in the range of about 3 to about 8 weight percent, preferably about 5 to about 7 weight percent.

The galactomannan gum clumping agent is combined with the liquid vehicle in an amount in the range of about 15 to about 30 weight percent, based on the weight of the liquid vehicle. Preferably, the amount of clumping agent present and dispersed in the liquid vehicle is in the range of about 20 to about 25 weight percent, based on the weight of the liquid vehicle.

To produce a clumping, yet relatively dust-free animal litter of the present invention, the clumping agent is first dispersed in the mineral oil or the like oleaginous vehicle, preferably with the non-ionic emulsifier present. The resulting dispersion is then distributed, e.g., by spraying, over the particulate non-swelling absorbent material having the desired particle size range so as to provide a desired clumping agent concentration on the particulate absorbent material as set forth hereinbelow.

Preferably, the galactomannan gum bearing mineral oil is sprayed onto an agitated particulate absorbent bed until the desired gum loading on the absorbent particles has been achieved. If desired, the spraying can be done at an elevated temperature to enhance fluidity and thus sprayability of the mineral oil.

The clumping agent is present in an amount in the range of about 0.25% to about 5% by weight, based upon the weight of the absorbent particles. It is preferred that the clumping agent be distributed on the absorbent particles in an amount in the range of about 0.5 weight percent to 2 weight percent, based on the weight of the absorbent particles. The range of about 0.75 to about 1.5 weight percent is an especially preferred amount for the clumping agent. The extender, if present, is present in an amount up to the amount of the clumping agent. That is, the clumping agent-to-extender weight ratio is at least 1:1, respectively. Higher weight ratios, e.g., 3:1 and 4:1, may be utilized, if desired. However, the respective weight ratio of about 1:1 to about 2:1 is preferred for clumping performance in view of product cost considerations.

The mineral oil is present on the absorbent particles in an amount in the range of about 2 to about 20 weight percent, based on the weight of the absorbent particles, preferably in an amount in the range of about 5 to about 10 weight percent. The mineral oil is present on the absorbent particles in a surface layer thereof and contains the dispersed clumping agent along with the optional non-ionic emulsifier.

The non-ionic emulsifier is present on the absorbent particles in an amount in the range of about 0.2 to about 1.6 weight percent, based on the weight of the absorbent particles, preferably about 0.3 to about 0.6 weight percent. The weight ratio of mineral oil-to-emulsifier in the absorbent particles preferably is in the range of about 12 to about 18, more preferably about 14.

The relative amount of clumping agent present is important because it provides spatial distribution of the clumping agent over the absorbent particle surface, not only for agglomerate formation upon contact with a limited amount of an aqueous liquid, such as a body fluid aliquot, but also for rapid and reliable dissolution of the clumping agent particles upon contact with a large excess of water, a condition usually present in a plumbing disposal system. Too high a concentration of the clumping agent, even in an excess of water, can lead to the formation of undesirable lumps which retard the dissolving process. Alternatively, if the amount of the clumping agent present is too low, the clump will not form on contact with the excreted body fluid, or will be too weak structurally for separation and disposal.

Figure 2:
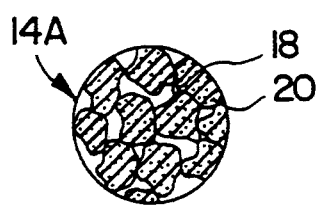

Referring to FIGS. 1 and 2, a bed 10 of particulate animal litter embodying the present invention is shown contained within litter box 12. A clump 16 is shown in a region of bed 10 where an animal has voided and thus caused an agglomeration of the particulate animal litter. A grouping of individual litter particles 14 is shown in section and enlarged at 14A. The grouping 14 is comprised of individual granules 18 having a surface layer 20 that includes mineral oil and a clumping agent dispersed therein, with or without a non-ionic emulsifier present.

The present invention is further illustrated by the following examples.

EXAMPLE 1

Preparation of a Guar Gum Dispersion in Mineral Oil

A liquid non-ionic emulsifier having an HLB value of about 10.8 (Igepal CO-530; polyoxyethylene(6) nonyl phenyl ether, about 10 grams) was combined with mineral oil (Medalist, about 156 grams). Thereafter, guar gum powder (Guar Gum NF Fine Mesh from Chart Corp.; about 34.4 grams) was stirred into the resulting admixture to produce a guar gum suspension of sprayable consistency. The relative amounts of the constituents in the suspension were as follows:

|  | Wt.-% |
|---|---|
| Mineral oil | 77.8 |
| Emulsifier | 5.0 |
| Guar gum | 17.2 |
|  | 100.0 |

EXAMPLE 2

Preparation of Clumping Cat Litter Using Clay

An aliquot of the mineral oil suspension of guar gum prepared in Example 1 (about 7.4 grams) was sprayed at ambient temperature onto clay particles (Oil-Dri RVM-GA, 20/60 mesh; about 100 grams) in an inclined, rotating container. After introduction of the entire aliquot of the suspension the container was rotated for an additional time period of about 15 minutes to assure substantially uniform distribution of the suspension over the clay particles present. The obtained particulate clay product had the following composition:

|  | Wt.-% | Wt.-%, Clay Basis |
|---|---|---|
| Clay (Attapulgite/Smectite, 20/60 mesh) | 92.6 | 100 |
| Mineral oil | 5.6 | 6 |
| Non-ionic emulsifier | 0.4 | 0.4 |
| Guar gum | 1.4 | 1.5 |
|  | 100.0 |  |

The thus produced particulate product was free flowing and was tested for clumpability. Very good clumps were produced upon contact with water. The produced clumps maintained their structure for a time period in excess of 48 hours. Results similar to the foregoing were obtained when the mineral oil was replaced by diethylene glycol, triethylene glycol, or propylene glycol, and the non-ionic emulsifier was omitted. The same particulate clay but untreated did not produce acceptable clumps when contacted with same amounts of water.

EXAMPLE 3

Preparation of Clumping Cat Litter Using Diatomaceous Earth

An aliquot of a mineral oil suspension of guar gum prepared in accordance with the method of Example 1 was sprayed at ambient temperature onto particles of diatomaceous earth (ODW-RVM, 14/40 mesh, moisture content about 6–8 wt.-%; about 1,250 grams) to provide a guar gum loading of about 2 weight percent on the diatomaceous particles. During spraying, the diatomaceous earth particles were agitated in an inclined rotating disc.

The particulate product produced in the foregoing manner was free flowing and was absorbent. Very good, coherent clumps of this particulate product were obtained upon contact with water.

The foregoing discussion and the accompanying examples are presented as illustrative, and are not to be taken as limiting. Still other variations within the spirit and scope of this invention are possible and will readily present themselves to those skilled in the art.

What is claimed is:

1. A particulate, free-flowing but clumpable animal litter composition which comprises discrete, non-swelling, absorbent clay particles having quar gum and carrageenan gum carried on the surface of said clay particles in an amount sufficient to form clay particle clumps when contacted with an aqueous liquid aliquot.

2. A particulate, free-flowing but clumpable animal litter composition which comprises discrete, non-swelling, absorbent clay particles having locust bean gum and carrageenan gum carried on the surface of said clay particles in an amount sufficient to form clay particle clumps when contacted with an aqueous liquid aliquot.

3. The composition of claim 2 additionally containing a xanthan gum.

* * * * *